United States Patent [19]

Mathison

[11] 4,215,087
[45] Jul. 29, 1980

[54] DEVICE AND METHOD FOR FORMING AN ANNULAR RAISED RIB ON A TUBULAR MEMBER

[75] Inventor: Donald W. Mathison, Minneapolis, Minn.

[73] Assignee: Product Design and Engineering, Inc., Minneapolis, Minn.

[21] Appl. No.: 869,510

[22] Filed: Jan. 16, 1978

Related U.S. Application Data

[62] Division of Ser. No. 792,356, Apr. 29, 1977, Pat. No. 4,102,623.

[51] Int. Cl.² ............................................. B29C 17/00
[52] U.S. Cl. ................................... 264/320; 264/296; 264/322
[58] Field of Search ....................... 264/296, 322, 320; 425/DIG. 218

[56] References Cited

U.S. PATENT DOCUMENTS 3,998,578  12/1976  Acda ..................... 425/DIG. 218 X Primary Examiner—Thomas P. Pavelko
Attorney, Agent, or Firm—Wicks & Nemer

[57] ABSTRACT

A device and method for forming an annular raised rib on a tubular member includes a mandrel having a primary portion which has a secondary portion slidably mounted on the outer end thereof. The inner end of the primary mandrel carried by a base. An expandle ring is carried by the secondary mandrel and the outer end of the primary mandrel. Further included is a movable die with means for moving the die to and upon the primary mandrel. The secondary mandrel is formed with an annular frusto-conical ramp for expanding the ring radially outwardly thereof which forces the wall of the tubular member outwardly thereby forming an annular raised rib on a tube of plastic mounted on the mandrels when the secondary mandrel is moved to and upon the primary mandrel.

1 Claim, 4 Drawing Figures

U.S. Patent        Jul. 29, 1980        4,215,087
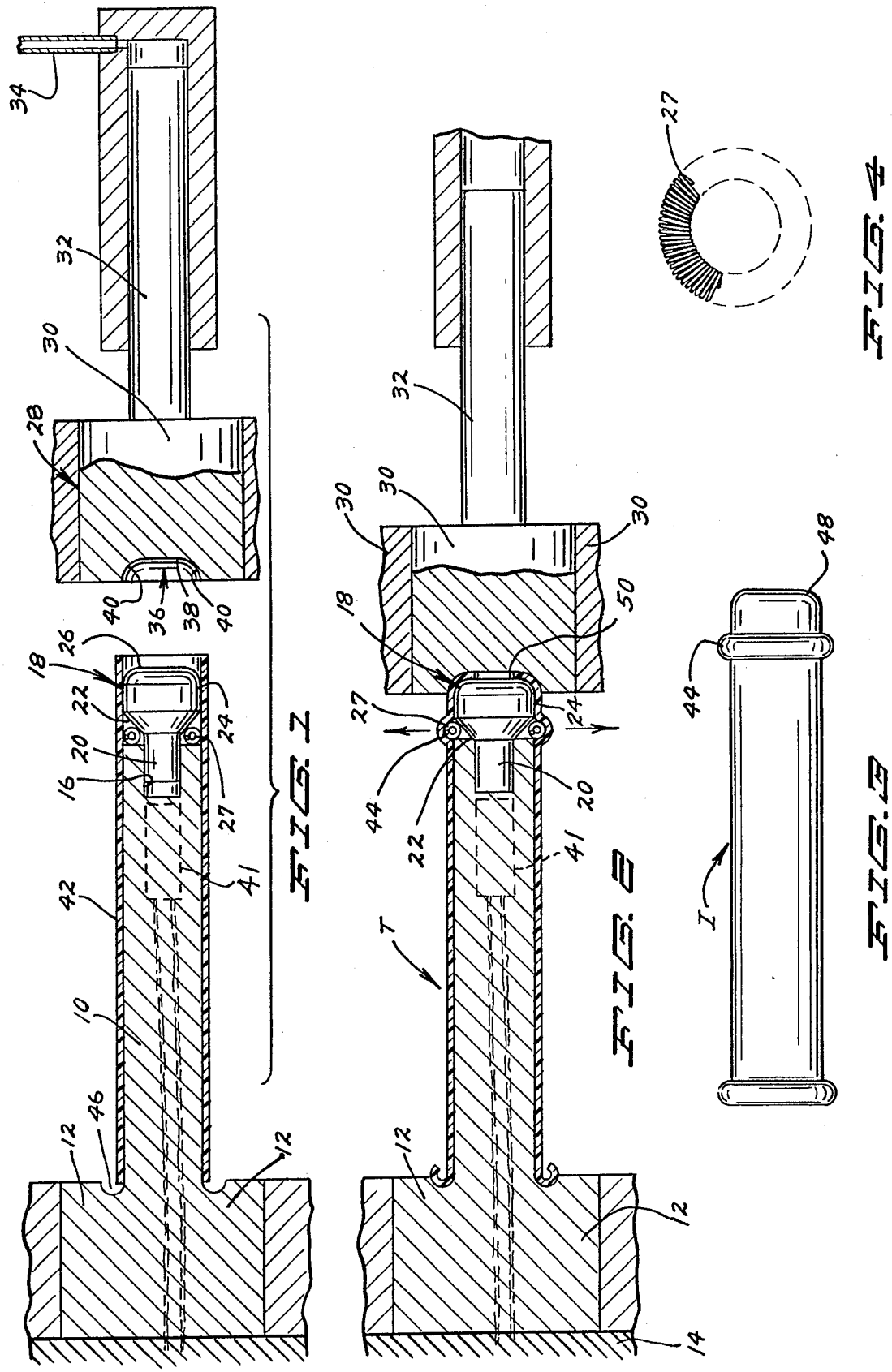

DEVICE AND METHOD FOR FORMING AN ANNULAR RAISED RIB ON A TUBULAR MEMBER

This application is a divisional application of application Ser. No. 792,356, filed Apr. 29, 1977 now U.S. Pat. No. 4,102,623.

SUMMARY

The invention relates to forming plastic parts and more particularly to a device and method for forming an annular raised rib on a plastic tubular member. It is an object of the invention to provide a device for forming an annular raised rib on a tubular member which is simple, relatively inexpensive, positive in action and which requires little maintenance.

The invention will appear more clearly from the following detailed description when taken in connection with the accompanying drawings, showing by way of example a preferred embodiment of the inventive idea wherein like numerals refer to like parts throughout.

In the drawings forming part of this application:

FIG. 1 is a longitudinal sectional view through a mandrel having a primary portion and a secondary portion and a heated moving die in open position with the plastic tubular member in position on the mandrel and embodying the invention.

FIG. 2 is a view similar to FIG. 1 but with the heated moving die in closed forming position upon the plastic tubular member.

FIG. 3 is a perspective view of the formed tubular member. P FIG. 4 is a side elevational view of the expandable ring.

Referring to the drawings in detail, the device and method of forming an annular raised rib on a plastic tubular member includes the primary mandrel portion 10 which has formed on the inner end thereof the base 12. The base 12 is pivotally but rigidly secured to the support 14 by conventional means for placement of a piece of tubing stock on the mandrel and ejection of the finished member off the mandrel by conventional means. The primary mandrels may be secured to the support 14 in gang formation and each is heated by a conventional electrical element 15.

The mandrel 10 has formed on the outer end thereof the axially formed recess 16. Further provided is the secondary movable mandrel portion 18 which includes the cylindrical inner end 20. The end 20 terminates in the frusto-conical ramp 22 which in turn terminates in the cylindrical base portion 24. The base portion 24 terminates in the outer rounded male end portion 26. The diameter of the base portion 24 of the movable mandrel portion 18 is the same as the diameter of the mandrel 10. The diameter of the end 20 of the mandrel portion 18 is such that it is snugly slidable in the recess 16 and the length of the base portion 24 is the same as that of the recess 16 whereby the movable mandrel 18 bottoms out when moved upon the primary mandrel. Positioned on and between the ramp 22 and the end of the mandrel 10 is the circular expandle member in one form of the coil wound circular spring 27.

The end 20 of the mandrel 18 is positioned through the circular spring 27, and then the end 20 slidably positioned in the recess 16 with the spring 27 between the outer end of the mandrel portion 10 and the ramp 20 of the mandrel portion 18.

The numeral 28 designates a movable forming die heated by conventional means not shown and the same includes the cylindrical base 30 from the outer end of which extends the shaft 32 movable axially by conventional hydraulic means indicated as 34. The base 30 of the forming die has formed on the inner end thereof the cup-shaped female recess 36 including the radially disposed bottom portion 38 which terminates in the annular radius 40. The recess 36 substantially corresponds to the rounded end 26 of the movable mandrel in mating relationship as illustrated particularly in FIG. 2. The primary mandrel has imbedded therein the conventional heater member 41 for heating the mandrel in the area of the outer end thereof.

The plastic tubular member T is formed as follows. A straight piece of plastic tubing 42, FIG. 1, is positioned on the mandrel 10 by conventional means not shown which is of a length to exceed slightly the end of the movable mandrel portion 18, particularly FIG. 1. The heater member 41 is then actuated. The movable forming die 28 is then moved by the hydraulic means 34 to place the die upon the movable secondary mandrel 18 and force the same axially from the position of FIG. 1 to that of FIG. 2 whereby the ramp 22 forces the spring up the ramp as it is positioned against the end of the mandrel 10 thereby increasing the diameter of the spring. The inner end of the tubular member T abuts and is formed in the annular recess 46 whereby the displacement of the member T upon the mandrel is limited. As a result the spring 27 increases its diameter from that of FIG. 1 to that of FIG. 2 whereby the spring forces the wall of the tube T radially outwardly which forms the annular outwardly extending rib 44, FIGS. 2 and 3. Simultaneously the end of the tube T is formed into the female recess 36 thereby forming the inturned annular end portion 48 with the axial opening 50. The member T is then ejected from the mandrel by conventional means not shown.

The invention disclosed herein briefly includes the following:

The method of forming an annular raised rib on a tubular member consisting in providing a primary mandrel and a secondary mandrel having a frusto-conical formation thereon, then slidably mounting said secondary mandrel on one end of said primary mandrel with the frusto-conical formation in juxtaposition to the one end of the primary mandrel, then positioning a flexible ring between the frusto-conical formation and the one end of said primary mandrel, then positioning a tubular plastic member upon said primary and secondary mandrels, then heating said primary mandrel, then moving said secondary mandrel toward said primary mandrel to cause said frusto-conical formation to expand the flexible ring radially outwardly of the end of the primary mandrel and against the tubular member to expand the same and form an annular raised rib thereon, then withdrawing the secondary mandrel from the primary mandrel whereby the ring contracts and then ejecting the tubular member from the primary and secondary mandrels.

Having thus described the invention, what is claimed as new and desired to be secured by Letters Patent is:

1. The method of forming an annular raised rib on a tubular member consisting in providing a fixed primary mandrel and a secondary mandrel having a frusto-conical formation thereon, then slidably mounting said secondary mandrel on one end of said primary mandrel with the frusto-conical formation in juxtaposition to the one end of the primary mandrel, then positioning a flexible ring between the frusto-conical formation and the one end of said primary mandrel, then positioning a tubular plastic member upon said primary and secondary mandrels, then heating said primary mandrel, then moving said secondary mandrel toward said primary mandrel to cause said frusto-conical formation to expand the flexible ring radially outwardly of the end of the primary mandrel and against the tubular member to expand the same and form an annular raised rib thereon, then withdrawing the secondary mandrel from the primary mandrel whereby the ring contracts and then ejecting the tubular member from the primary and secondary mandrels.

* * * * *